Figure 2:
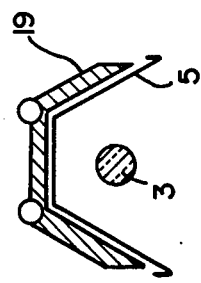

United States Patent [19]

Troue

[11] 4,135,098
[45] Jan. 16, 1979

[54] METHOD AND APPARATUS FOR CURING COATING MATERIALS

[75] Inventor: Harden H. Troue, Plainfield, Ind.

[73] Assignee: Union Carbide Corporation, New York, N.Y.

[21] Appl. No.: 739,120

[22] Filed: Nov. 5, 1976

[51] Int. Cl.² ............................................. F21V 7/20
[52] U.S. Cl. .................................... 250/492 R; 34/4; 34/41; 250/504
[58] Field of Search .................. 250/503, 504, 492 R; 34/4, 41, 60; 427/54

[56] References Cited

U.S. PATENT DOCUMENTS

| | | | |
|---|---|---|---|
| 3,151,950 | 10/1964 | Newman et al. | 34/4 |
| 3,790,801 | 2/1974 | Coleman | 250/492 X |
| 3,807,052 | 4/1974 | Troue | 34/1 |
| 3,819,929 | 6/1974 | Newman | 34/4 |
| 3,826,014 | 7/1974 | Helding | 34/4 |
| 3,936,950 | 2/1976 | Troue | 34/4 |
| 3,972,127 | 8/1976 | Hoshi et al. | 34/41 |
| 4,005,135 | 1/1977 | Helding | 34/4 |

FOREIGN PATENT DOCUMENTS 761815  4/1935  France ..................................... 250/492

*Primary Examiner*—William F. O'Dea
*Assistant Examiner*—Harold Joyce
*Attorney, Agent, or Firm*—Saul R. Bresch

[57] ABSTRACT

Apparatus for photocuring a coating on a moving substrate in a system including a first and second tunnel with a treating chamber located therebetween and housing at least 1 mercury vapor lamp. The mercury vapor lamp has associated therewith a reflector module for directing UV light to the substrate. The reflector module temperature is controlled by physically spacing a liquid cooled heat sink from the reflector module so that only radiation heat transfer occurs therebetween.

The method of the invention comprises controlling the temperature of the reflector surface so that the surface is always at a temperature at least as high as the temperature of the coating to be cured.

4 Claims, 2 Drawing Figures

METHOD AND APPARATUS FOR CURING COATING MATERIALS

This invention relates to a system for curing coating materials and more particularly to a system for curing photocurable coating materials using mercury vapor lamps.

It is well know that a significant improvement in photopolymerization processing is realized when the chemical coating to be cured is blanketed by an inert atmosphere during exposure to ultraviolet (UV) radiation. Mercury vapor lamps are a principle source of ultraviolet energy. More recently systems have been developed for blanketing a coating to be cured by UV radiation from mercury vapor lamps. One such system is described in U.S. Pat. Nos. 3,936,950 issued Feb. 10, 1976 and 3,807,052 issued Apr. 30, 1974. Such systems include a treatment enclosure for irradiating a coating on a moving product which passes through the enclosure. The enclosure consists of an open treatment chamber housing a set of mercury vapor lamps. Tunnels extend longitudinally from opposite sides of the treatment chamber. The upstream tunnel contains a gas injector for introducing an inert gas at the moving product to blanket the product. In such a system the mercury vapor lamps are used in conjunction with reflector modules and usually the reflector surfaces are directly conductively cooled. It was found that in many cases vapors would leave the coating due to excessive coating and substrate temperatures and be deposited upon the reflector surfaces and lamps causing a reduction in UV output and sometimes failure to cure adequately. A system had to be developed for eliminating the deposition of coating vapors on the mercury vapor lamps and reflector surfaces.

It was discovered that the cause of the problem was strong thermal convection currents rising from the hot coated substrate to be cured to the cooler reflector surfaces located behind the lamps resulting in a thermal pumping action, pumping vapors to the surface of the reflectors where the vapors would be condensed and thus coat the surface of the reflectors and/or the lamps themselves.

A system has been developed for substantially reducing the vapors reaching the reflector surfaces and lamps in curing apparatus of the type generally described in U.S. Pat. Nos. 3,936,950 and 3,807,052. It was discovered that vapors which would normally reach the reflector surfaces could be substantially prevented from doing so by a combination of vapor shield gas flow which would force the vapors to exit the rear tunnel and by controlling the thermal pumping action by substantially eliminating the convection currents in the treatment chamber. It was later established that while the preferred embodiment included a combination of vapor shield gas flow and control of the thermal convection current, it was possible to minimize the problem by controlling thermal convection currents alone.

Accordingly, it is a main object of the invention to provide a system for radiation curing wherein the problem of vapor deposition on the system optics is minimized.

Another object is to provide a method for minimizing vapor deposition on the system optics and lamps.

In a broad aspect of the invention these objectives are accomplished by a system for curing photocurable coatings by UV radiation from mercury vapor lamp including an enclosure having a treating chamber and a first tunnel and second tunnel with the first tunnel located upstream of the chamber relative to a coated substrate moving through said enclosure and the second tunnel located downstream of said chamber. The treating chamber houses at least one line source of UV light. The light source, usually a mercury vapor lamp, has a reflector module with a liquid cooled heat sink associated therewith for directing UV to the surface of the moving substrate. The liquid is typically water or ethylene glycol and water. Included in the system is the improvement wherein the liquid cooled heat sink partially surrounds and is separated from the reflector module surface so that the only heat transfer therebetween is by radiation heat transfer.

In another aspect of the invention the objectives are accomplished by a method practiced in the system described above comprising controlling the radiative heat transfer from the reflector module surface so that the temperature of the reflector module surface is always at a temperature at least as high as the temperature of the coating to be cured.

In a narrower aspect the method also includes directing a vapor shielding gas flow in the same direction as the travel of the moving coated substrate and exhausting the shielding gas with substantially all the vapors emanating from the coating to be cured through the second or exit tunnel of the system. The vapor shielding gas flow may be parallel or may be directed downwardly toward the substrate surface at an angle of from about 5 degrees to about 15 degrees from the horizontal.

Figure 1:
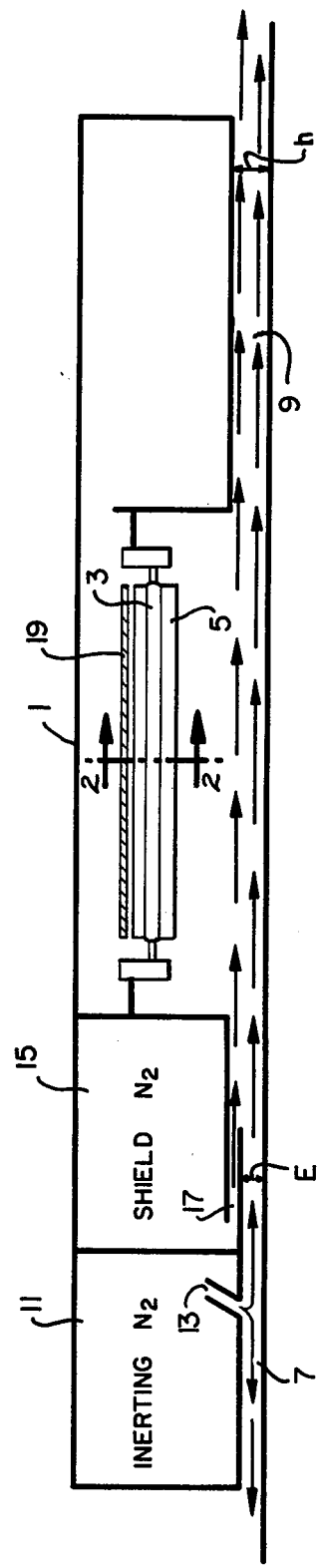

In the drawings, FIG. 1 is schematic drawing of a typical apparatus for carrying out the invention and FIG. 2 is a section taken along the line A—A in FIG. 1.

Referring now to the drawings, a typical system for carrying out the principle of the invention is shown diagrammatically and comprises a treating chamber 1 in which is mounted a source of UV light 3 usually a series of medium pressure mercury vapor lamps. The UV source 3 has a reflector surface 5 which partially surrounds such source for directing UV to the surface of substrate moving through a first or inlet tunnel 7 through the treating chamber 1 where a coating on the substrate is cured by UV light and then out through a second or exit tunnel 9.

Inert gas is supplied from the plenum chamber 11 and passed through an injector 13 as described in U.S. Pat. No. 3,936,950. The purpose of this gas described in such patent is to blanket the surface of the moving substrate to eliminate oxygen which inhibits curing. In one aspect of this invention a second source of inert gas is provided through shielding gas chamber 15. Gas from this chamber is directed parallel to and in the same direction as the travel of the moving coated substrate through port 17. While the direction is shown as being parallel the flow may be directed toward the moving substrate and may be from about 5 degrees to 15 degrees from the horizontal. This vapor shielding gas holds down substantially all the vapors emanating from the coating as it is cured and carries them out through tunnel 9. It is desirable that the height (h) of exit tunnel 9 be greater than the height (E) of inlet tunnel 7. This allows the vapors to exit the treating chamber with and below the shielding gas more easily. It was found that the vapors emanating from the coating surface collect under and raise the laminar flow of the vapor shield inert gas from the coating surface thereby increasing the thickness of the laminar flow layer. Thus an exit tunnel of greater height than the inlet tunnel will facilitate exhausting the vapors from the system. While this shielding gas flow is preferred it is possible to practice the invention without the shielding gas flow.

In this invention it has been discovered that the water cooled heat sink 19 must be spaced from the reflector module surface 5 so that only radiation heat transfer takes place between the reflector module surface 5 and the heat sink 19. As mentioned above it was discovered that the cause of vapor deposition on the lamps and reflector module surfaces was strong thermal convection currents rising from the relatively hot substrate to the cooler reflector surface. It was discovered that the problem could be minimized by controlling the temperature of the reflector surfaces to minimize convection currents. The mode of reflector surface cooling, however, is critical. Air or gas cooling is not practical because this adds turbulent air or gas currents to the treating chamber and aggravates the thermal convection pumping problem. The method of temperature control is one of radiation heat transfer only. This is accomplished by having no contact between the reflector and heat sink surfaces. Further control is obtained by painting or coating the opposing surfaces between the heat sink 19 and the reflectors black so as to control the rate of radiation heat transfer therebetween.

In a typical application wherein floor tiles are to be cured by the system of the invention the tile temperature can range up to about 200° F. (usually about 140° F. to 170° F.). A typical reflector used with a 100 watt in. mercury vapor lamp will reach about 400° F. which is hotter than the tile temperature and there will be little or no tendency for thermal convection of coating vapors from the coated tile surface to the reflector surface.

The operation of the invention with temperature controlled reflectors can also provide a high enough temperature at the reflector surfaces so that the vapor pressure of any vapor at such temperature will cause the vapor striking the reflector surface to re-evaporate thus preventing condensation.

The use of the radiation cooled temperature controlled reflectors offers two modes of operations to keep the reflectors clean.

1. A favorable temperature profile is established over the coated substrate surface to assist the laminar flow at the surface of the substrate in holding down and removing the vapors as rapidly as they are released from the coating and 2. The reflector temperature is controllably maintained at a temperature where the vapor's partial pressure is greater than 760 mm Hg (1 atmosphere) so as to cause any vapors reaching the reflector surface to reevaporate rapidly into the chamber atmosphere which will be limited to the vapor partial pressure consistent with the temperature of the chamber atmosphere.

In all cases of vapor control, the relative substrate to reflector temperature ratio is important. Thus, the situation will always be substantially aided by keeping the substrate as cool as possible during the curing steps so as to keep the vapor pressure of the volatile components as low as possible. This can be accomplished both by cooling the substrate before and during curing and by keeping the incident flux level as low as possible to minimize temperature rise during cure to only the exothermic reaction heat.

While the invention has been described with reference to certain preferred embodiments for practicing the invention it should be understood that modifications and additions may be made to the basic concept of the invention without departing from the spirit and scope thereof. For example, to minimize the amount of inert gas used in the system it is possible to provide a vapor shield air flow downstream of the first treating chamber and before a second treating chamber. Likewise it is possible to provide exhaust tunnels before the first or inlet tunnel and after the second or exit tunnel with provision for controlling the pressure ratio between these tunnels to assist in proportioning flow out each exhaust tunnel so as to maintain inert gas flow while removing as many vapors as possible.

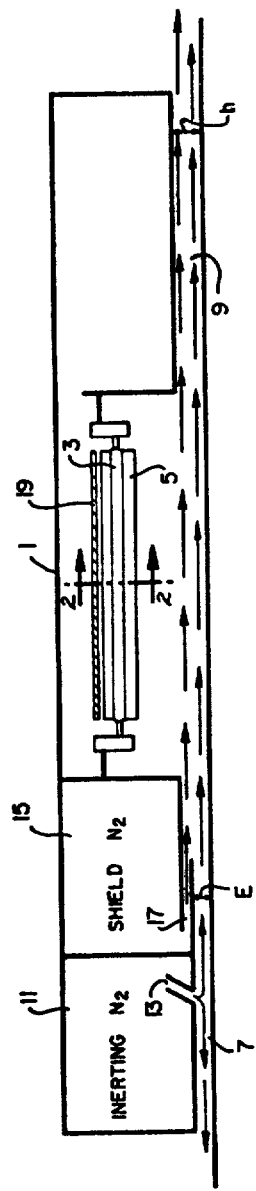

What is claimed is:

1. A method for preventing the deposition of vapors on a reflector module surface used to direct ultraviolet radiation from a source thereof to a substrate coated with a coating to be cured by such ultraviolet radiation in a system including an enclosure having a treating chamber and a first and second tunnel with the first tunnel located upstream of said chamber relative to said coated substrate moving through said enclosure and the second tunnel located downstream of said chamber, said treating chamber having at least one linear source of said ultraviolet radiation mounted therein and having at least one reflector module for directing said ultraviolet radiation to the surface of the moving substrate, which method comprises partially surrounding said reflector module with a liquid cooled heat sink separated from said reflector module, permitting only radiation heat transfer between said reflector module surface and said liquid cooled heat sink, and controlling the radiation heat transfer whereby the temperature of the reflector module surface is always at a temperature at least as high as the temperature of the coating to be cured on said moving substrate.

2. Method according to claim 1 wherein the temperature of the reflector module surface is maintained at a temperature at which the partial pressure of the vapors emanating from the coating to be cured is greater than 760 mm Hg.

3. Method according to claim 2, wherein said liquid is water.

4. Method according to claim 2 wherein said liquid is a mixture of water and ethylene glycol.

* * * * *

UNITED STATES PATENT OFFICE
CERTIFICATE OF CORRECTION

Patent No. 4,135,098     Dated January 16, 1979

Inventor(s) Harden H. Troue

It is certified that error appears in the above-identified patent and that said Letters Patent are hereby corrected as shown below:

Cancel unnumbered figure appearing on title page and substitute the attached figure therefor.

Signed and Sealed this

Third Day of April 1979

[SEAL]

Attest:

RUTH C. MASON
Attesting Officer

DONALD W. BANNER
Commissioner of Patents and Trademarks